United States Patent [19]
Bouffard et al.

[11] Patent Number: 5,939,801
[45] Date of Patent: Aug. 17, 1999

[54] REMOTE D.C. POWER SUPPLY WITH AUTOMATIC BACKUP POWER FEATURE

[76] Inventors: Donald M. Bouffard, 4415 Congdon, Williamston, Mich. 48895; Gary L. Stepanian, 4918 Driftwood, Commerce Township, Mich. 48382; David C. Emmett, 10685 Warren Rd.; Jeffrey P. Stolaruk, 15142 Lakewood, both of Plymouth, Mich. 48170

[21] Appl. No.: 08/850,287

[22] Filed: May 5, 1997

[51] Int. Cl.$^6$ ........................................................ H02J 7/00
[52] U.S. Cl. .............................. 307/65; 307/64; 307/85; 307/18; 307/23
[58] Field of Search ................................. 307/64, 65, 66, 307/85, 86, 87, 11, 18, 19, 20, 21, 23, 24, 29, 38; 361/732

[56] References Cited

U.S. PATENT DOCUMENTS

| | | | |
|---|---|---|---|
| 4,401,895 | 8/1983 | Petkovsek | 307/66 |
| 5,089,937 | 2/1992 | Carrubba et al. | 361/732 |
| 5,315,533 | 5/1994 | Stich et al. | 364/480 |
| 5,534,734 | 7/1996 | Pugh et al. | 307/38 |
| 5,616,968 | 4/1997 | Fujii et al. | 307/66 |
| 5,642,002 | 6/1997 | Mekanik et al. | 307/64 |

*Primary Examiner*—Jeffrey Gaffin
*Assistant Examiner*—Jonathan S. Kaplan
*Attorney, Agent, or Firm*—Barnes, Kisselle, Raisch, Choate, Whittemore & Hulbert, P.C.

[57] ABSTRACT

Apparatus for controlling distribution of d.c. power to a plurality of remote d.c.-powered LAN transceivers, which includes a plurality of primary d.c. power supplies and at least one backup d.c. power supply, all having means for connection to a source of electrical power to provide output d.c. power independently of each other. A plurality of electrical switches are each operable in a first mode of operation to connect one of the primary power supplies to at least one set of output terminals for connection to a remote transceiver. Comparator circuits compare the output voltage at each of the primary power supplies to the output voltage at the backup power supply to indicate a failure condition at one of the primary supplies. Circuitry is responsive to a failure indication for operating one or more of the electrical switches in a second mode of operation in which at least one set of output terminals is connected to the backup power supply. Thus, the output terminals and LAN transceivers connected thereto are continuously supplied with uninterrupted electrical power in the event of a power failure at one or more of the primary power supplies.

25 Claims, 4 Drawing Sheets

REMOTE D.C. POWER SUPPLY WITH AUTOMATIC BACKUP POWER FEATURE

The present invention is directed to apparatus for controlling distribution of d.c. power to a plurality of remote d.c.-powered devices, and more particularly to a power supply for selectively applying primary and backup d.c. power to remote powered devices such as wireless local area network (LAN) transceivers.

BACKGROUND AND SUMMARY OF THE INVENTION

There are many applications in education and industry in which it is desirable to supply electrical power to a plurality of remotely located devices. It is conventional practice to provide for connection of each of these devices to a source of utility power, such as 120 VAC typically with an external ac/dc converter. However, electrical codes require that utility power cables be fed through metal conduits or raceways separate from signal and data cables, undesirably increasing the cost and complexity of installation. For example, in wireless local area network (LAN) applications, each of the transceivers is conventionally connected to a utility power source by utility power cabling fed through conduits and raceways separate from the data and signal cabling.

It is a general object of the present invention to provide a power distribution system and apparatus that eliminate the requirement in the prior art for separate utility power cabling to the remote powered devices, such as LAN transceivers in the specific embodiment of the invention herein disclosed. A more specific object of the present invention is to provide a power distribution system and apparatus of the described character in which power is fed to the remote devices at low voltage level—e.g., in the range of 8 to 28 volts d.c.—that allows the power to be applied to the remote apparatus through the same cabling as carries the signal data. Another and yet more specific object of the present invention is to provide an apparatus for controlling distribution of d.c. power to a plurality of remote d.c.-powered devices in which a plurality of independent d.c. power supplies are provided for supplying primary and backup power to the remote devices, and that includes capability for detecting failure at any one of the primary power supplies and automatically connecting the associated remote devices to the backup supply. A further object of the present invention is to provide an apparatus of the described character that includes facility for locally and/or remotely indicating a power supply failure condition, preferably including an audible failure indication and means for selectively disabling the audible failure indication either remotely or at the power distribution apparatus.

Apparatus for controlling distribution of d.c. power to a plurality of remote d.c. -powered devices in accordance with the present invention includes a plurality of independent d.c. power supplies with facility for connecting the supplies to a source of electrical power such as a utility power line. A plurality of electrical switches are operable in a first mode of operation for connecting a first number of the power supplies to apparatus outputs for connection to the remote devices. Failure detection circuitry detects power failure at one or more of the first number of power supplies, and operates one or more of the switches in a second mode of operation to connect a second number of the power supplies different from the first number to the apparatus outputs in place of the one or more power supplies at which failure is indicated.

In a presently preferred implementation of the invention, there is provided apparatus for controlling distribution of d.c. power to a plurality of remote d.c.-powered LAN transceivers, which includes a plurality of first or primary d.c. power supplies and at least one second or backup d.c. power supply, all having means for connection to a source of electrical power to supply output d.c. power independently of each other. A plurality of electrical switches are each operable in a first mode of operation to connect one of the primary power supplies to at least one set of output terminals for connection to a remote transceiver. Comparator circuits compare the output voltage at each of the primary power supplies to output voltage at the backup power supply to indicate a failure condition at one of the primary supplies. Circuitry is responsive to such a failure indication for operating one or more of the electrical switches in a second mode of operation in which at least one set of output terminals is connected to the backup power supply. Thus, the output terminals and LAN transceivers connected thereto are continuously supplied with uninterrupted electrical power in the event of a power failure at one or more of the primary power supplies.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 1:
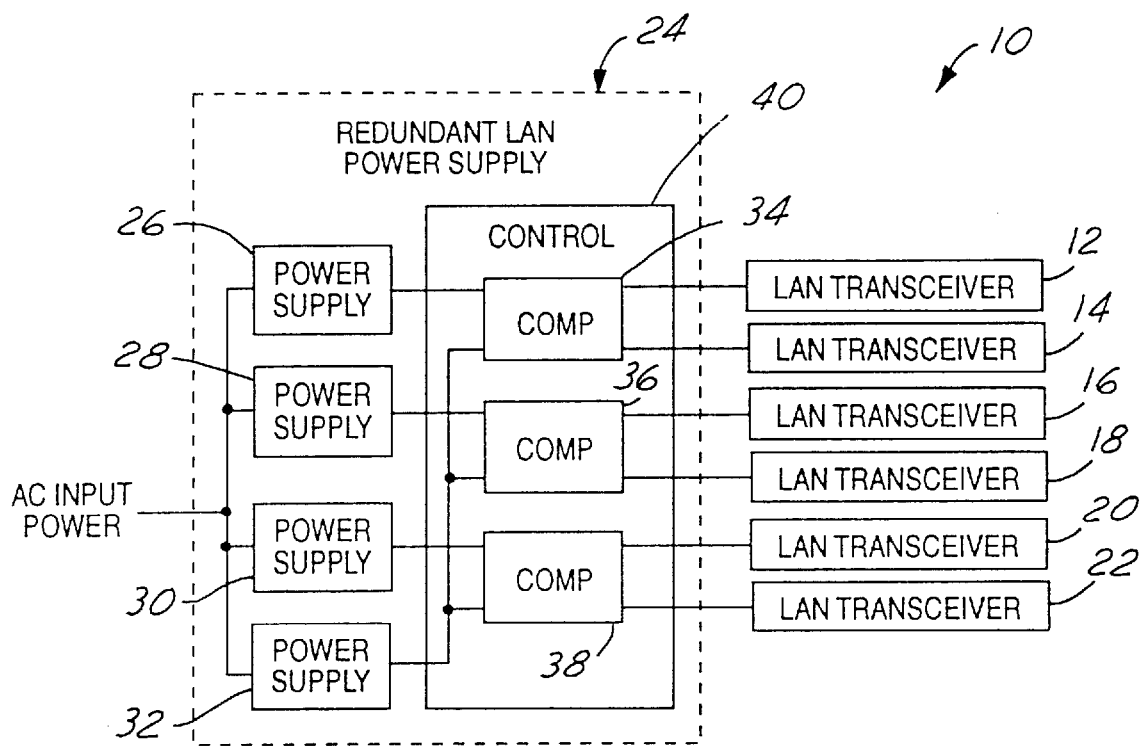
FIG. 1 is a functional block diagram of a power system that includes a power distribution and control unit in accordance with a presently preferred embodiment of the invention.

FIG. 1 illustrates a power distribution system 10 in accordance with one presently preferred implementation of the invention for supplying redundant low-level d.c. electrical power to a plurality of remote local area network (LAN) transceivers 12, 14, 16, 18, 20 and 22. It will be appreciated as the description unfolds, however, that the principles of the present invention are by no means limited or restricted specifically to use in conjunction with LAN transceivers, but in fact are applicable to any situation in which redundant low-level d.c. power is to be supplied to a plurality of remote devices or loads. A power distribution control unit 24 has an input power line for connection to a source of a.c. input power, such as a utility power line, and a plurality of output lines for supplying low-level d.c. power individually to each of the transceivers 12–22. Power distribution control unit 24 includes a plurality of primary power supplies 26, 28, 30 and a backup or secondary power supply 32. Each of the primary power supplies 26, 28, 30 provides an input to an associated comparator 34, 36, 38 within a power distribution control circuit 40. Secondary power supply 32 also provides an input to each of the comparators 34–38. In general, the function of each comparator 34–38 is to compare the output voltage levels at the primary and secondary input power supplies, and to control supply d.c. power to a pair of LAN transceivers. That is, comparator 34 controls application of either primary or backup power to LAN transceivers 12, 14, comparator 36 controls application of either primary or backup power to transceivers 16, 18 and comparator 38 controls application of either primary or backup power to transceivers 20, 22.

Figure 2:
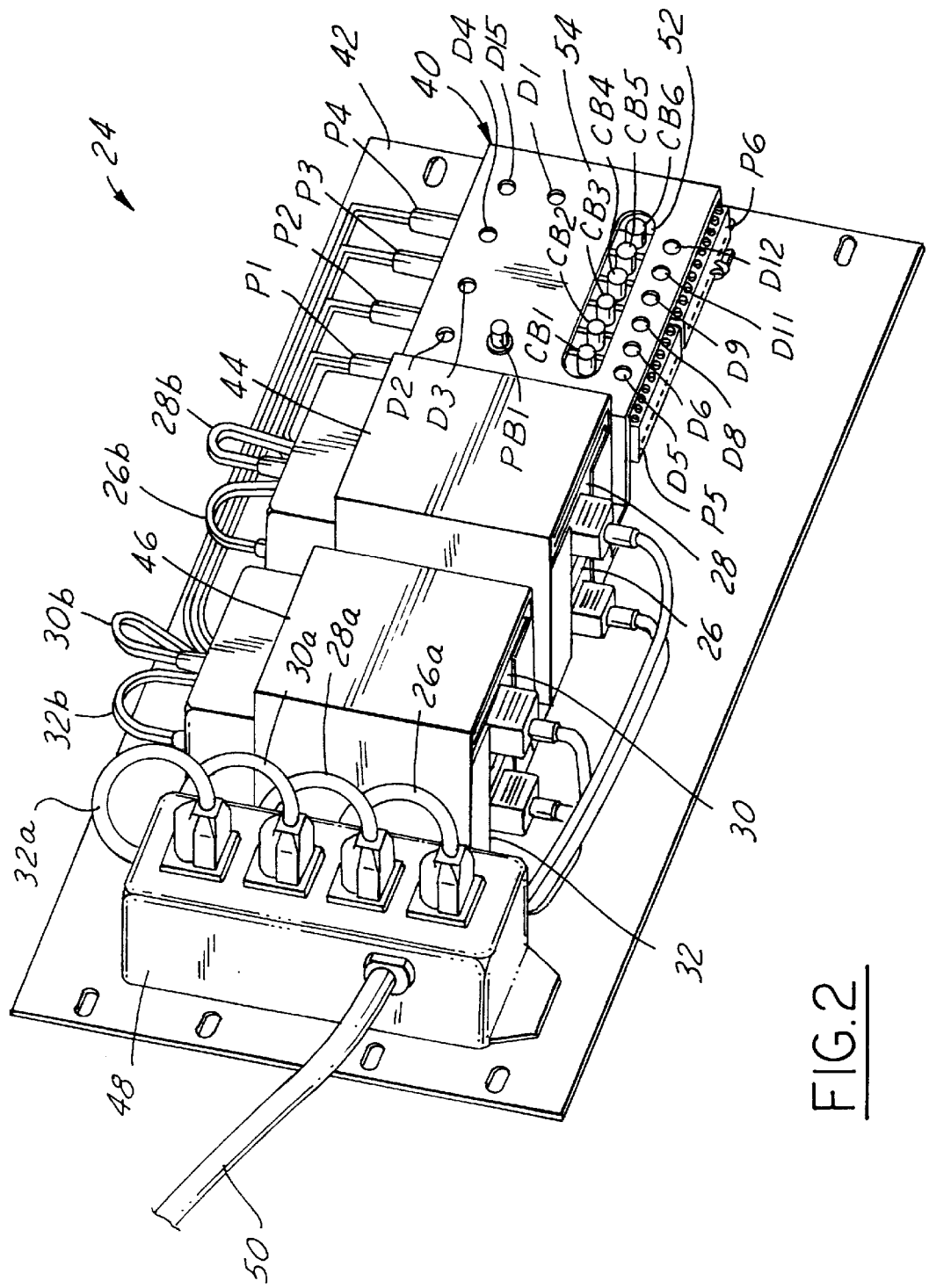
FIG. 2 is a perspective view of the power control and distribution unit illustrated functionally in FIG. 1.

FIG. 2 illustrates control unit 24 as comprising a panel 42 on which all of the remaining components are mounted. Power supplies 26–32 are individually replaceably mounted in pairs within associated mounting brackets 44, 46 fastened to mounting panel 42. Power supplies 26–32 each have an associated input power cable 26a, 28a, 30a, 32a having a plug on the end remote from the power supply removably received in a power distribution strip 48 mounted on panel 42. Distribution strip 48 has a power input cable 50 for connection to a source of 120 VAC 60 Hz utility power. Other supply voltages and/or frequencies may be employed. Each power supply 26–32 also has an associated output cable 26b, 28b, 30b, 32b having a plug P1, P2, P3, P4 at the remote end for removable connection to power control unit 40. The particular power supplies illustrated are twenty-four volt d.c. supplies, although other output voltages may be employed. Power control unit 40 comprises a circuitboard assembly 52 (FIGS. 3A and 3B) mounted on panel 42 beneath an overlying protective cover 54. Circuitboard assembly 52 has connectors for removably receiving plugs P1–P4, and connectors P5 and P6 for connection to LAN transceivers 12–22 (FIG. 1) and other external circuitry, as will be described.

Figure 3A:
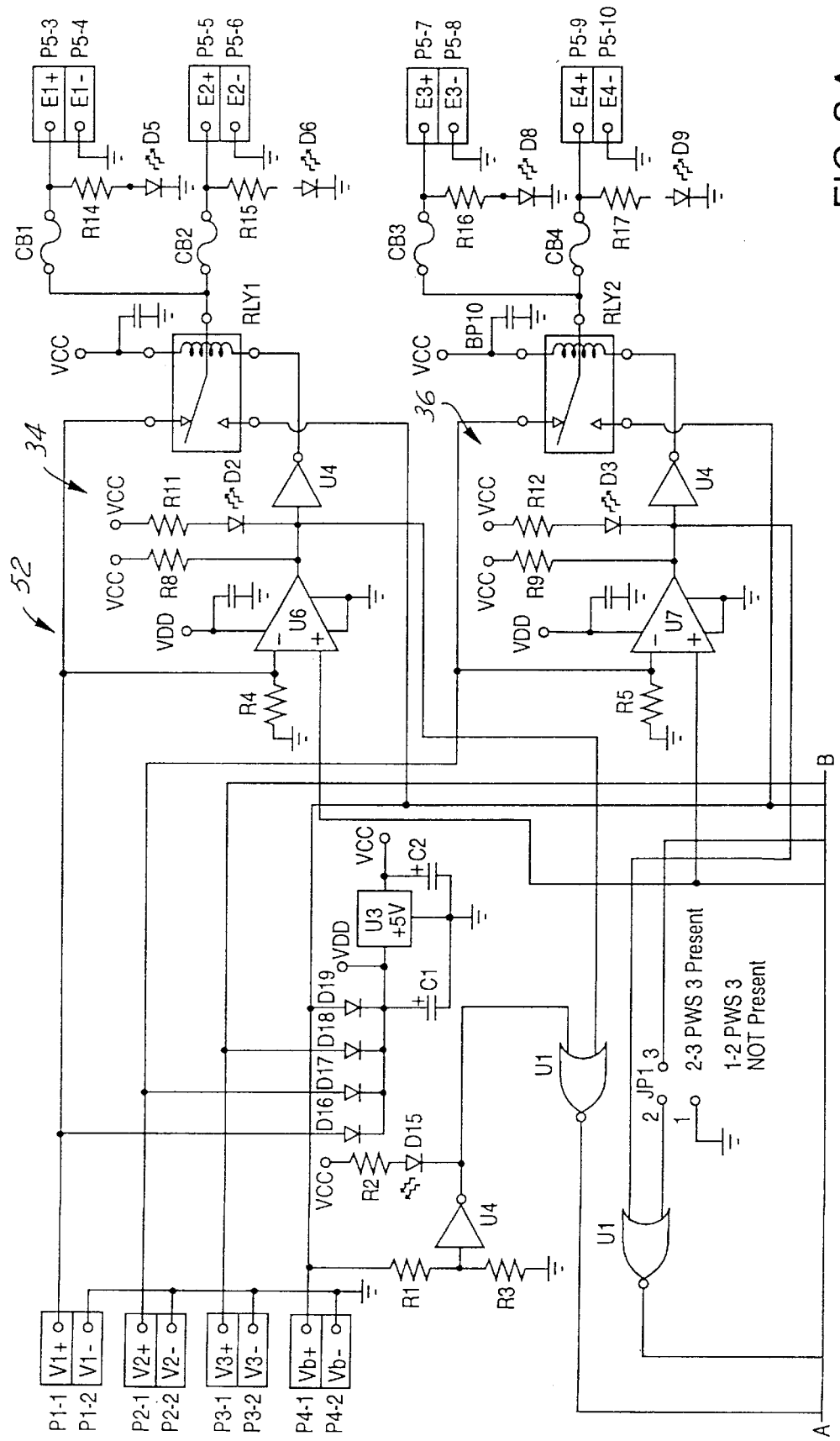
FIGS. 3A and 3B. when interconnected along the line A–B in each figure, together comprise an electrical schematic diagram of the power distribution control unit illustrated in FIGS. 1 and 2.
Figure 3B:
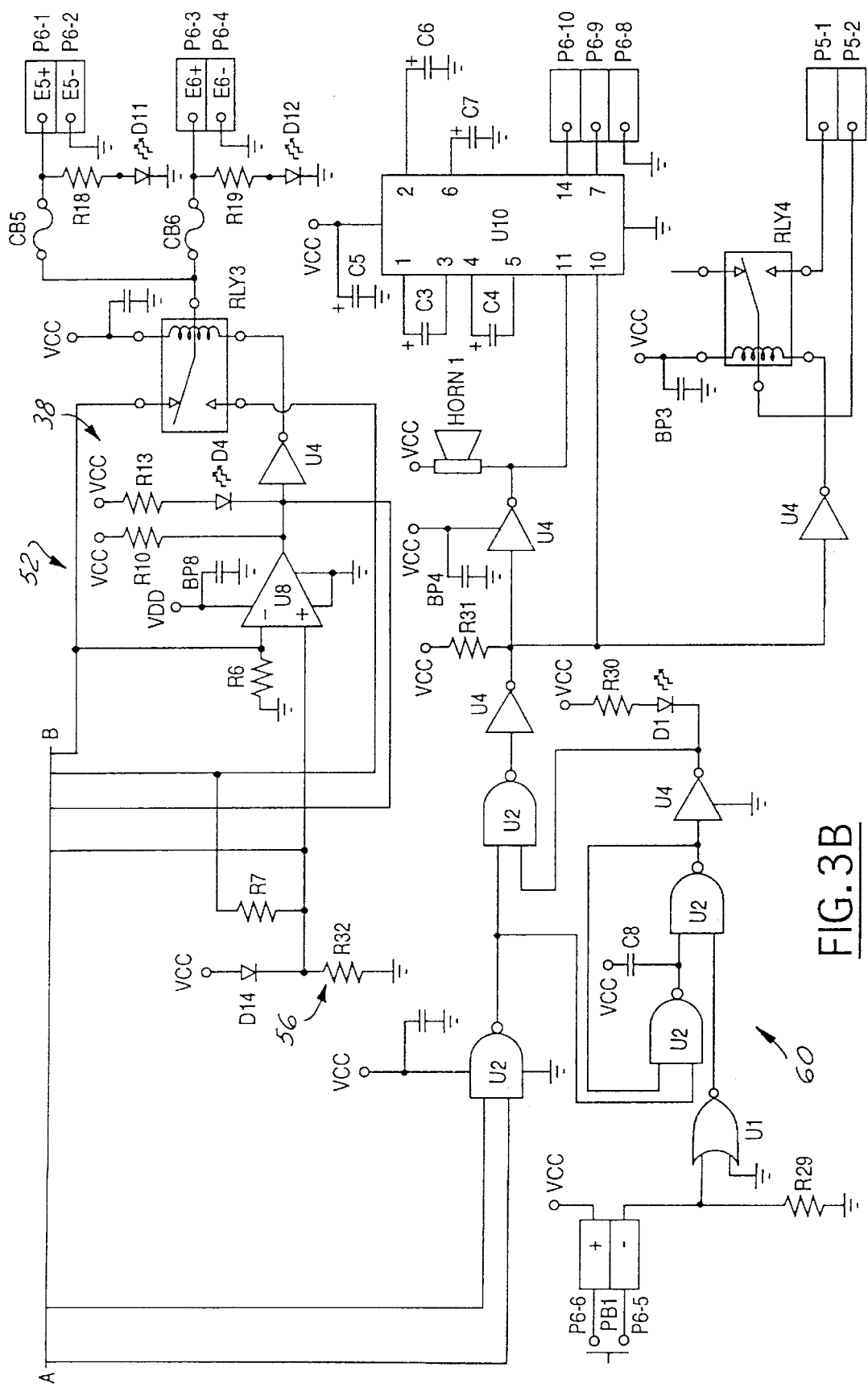

Referring to FIG. 3A, the connectors that receive plugs P1–P4 each have a negative terminal connected to an electrical ground. The positive terminals from connectors P1–P3 are each connected to the normally closed contact of an associated relay switch RLY1, RLY2 (FIG. 3A) and RLY3 (FIG. 3B). The positive terminal of connector P4 is connected to the normally open contacts of all relay switches RLY1–RLY3. The positive terminals of connectors P1–P4 are also connected through associated diodes D16, D17, D18, D19 to the power input terminal of a voltage regulator U3, which has an output that supplies electrical power to the remaining circuitry in FIGS. 3A and 3B. The common contact of relay switch RLY1 is connected through a pair of circuit breakers CB1, CB2 to the positive terminal of an associated output terminal pair E1, E2 on output connector P5. A resistor R14 and an LED D5 are connected across the E1 output, and a resistor R15 and an LED D6 are connected across the E2 output. In the same way, the common contact of relay switch RLY2 is connected through circuit breakers CB3, CB4 to outputs E3, E4 at connector P5, with resistor/LED pairs R16, D8 and R17, D9 being connected across the E3 and E4 outputs. The common contact of relay switch RLY3 (FIG. 3B) is connected through a pair of circuit breakers CB5, CB6 to E5 and E6 outputs at connector P6, and resistor/LED pairs R18, D11 and R19, D12 are connected across the E5 and E6 outputs. Circuit breakers CB1–CB6 are accessible through a slot in cover 54 as shown in FIG. 1, and LED's D5–D12 are visible through corresponding apertures in cover 54.

Comparator 34 (FIGS. 1 and 3A) includes an operational amplifier U6 having an inverting input coupled to the positive terminal of connector P1 and a non-inverting input connected to the junction of resistors R7, R32 that form a voltage divider 56 (FIG. 3B). Voltage divider 56 receives input power from the positive terminal of connector P4—i.e., from the backup power supply. Thus, comparator 34 compares the voltage level of primary power supply 26 at connector P1 to a percentage of the voltage level of auxiliary power supply 32 at connector P4. This percentage preferably is 80%. If the power available at connector P1 falls below 80% of the voltage level at the backup power supply, amplifier U6 is activated to extinguish LED D2 and to energize the relay coil of relay switch RLY1 through inverter U4. Relay switch RLY1 is thus activated to disconnect application of power from primary power supply 26 at connector P1, and to apply power to outputs E1 and E2 from auxiliary power supply 32 at connector P4. LED D2, which is visible through an aperture in cover 54 (FIG. 2) is illuminated to indicate application of power to outputs E1 and E2 from primary power supply 26 at connector P1, and is extinguished when power applied to outputs E1 and E2 is from auxiliary power supply 32 at connector P4.

Comparators 36 (FIGS. 1 and 3A) and 38 (FIGS. 1 and 3B) are of structure identical to comparator 34 hereinabove discussed in detail. Thus, LED D3 in comparator 36 is illuminated and visible through cover 54 (FIG. 2) when power applied to outputs E3 and E4 is from primary power supply 28 at connector P2, and is extinguished when power applied to connectors E3 and E4 is from auxiliary power supply 32 at connector P4. In the same way, LED D4 (FIGS. 2 and 3B) is illuminated to indicate that power is applied at outputs E5 and E6 from primary power supply 30 at connector P3, and is extinguished when power is applied at outputs E3 and E4 from auxiliary power supply 32 at connector P4. An LED D15 (FIG. 3A) is connected to the output of an inverter U4 coupled to connector P4 to indicate, when illuminated, that an auxiliary power supply 32 is coupled to connector P4. Thus, comparators 34, 36, 38 normally connect the primary power supplies to output pairs E1 and E2, E3 and E4, E5 and E6 respectively through relay switches RLY1, RLY2 and RLY3, and connect the output pairs to auxiliary power when the associated primary power input falls below a selected level, in this case 80%, of auxiliary power voltage.

A pair or NOR gates U1 (FIG. 3A) receive inputs from inverter U4, amplifier U6, amplifier U7 and amplifier U8 respectively. The input from amplifier U8 is fed through a jumper set JP1, which grounds the corresponding input to the NOR gate in the event that a third primary power supply 30 is not employed, and connects the NOR gate input to the comparator output when the third primary power supply is employed. Thus, jumper set JP1 effectively accommodates use of the preferred embodiment of the invention with only two primary power supplies and an auxiliary or backup power supply. The outputs of gates U1 are connected to a NAND gate U2 (FIG. 3B), which is responsive to triggering of any comparator 34, 36, 38, or absence or failure of an auxiliary power supply at connector P4 for activating an audible alarm HORN1. That is, alarm HORN1 is activated if an auxiliary power supply is not present, or in the event of a low voltage detection at any of the primary power supplies. In the event that audible alarm HORN1 is so activated, the alarm condition that caused activation of the HORN will be indicated by the illumination conditions of LED's D2, D3, D4 and D15. A push-button switch PB1 (FIGS. 2 and 3B) is coupled through connector P6 to a circuit 60 for selectively silencing alarm HORN1, and for illuminating an LED D1 (FIGS. 2 and 3B) to indicate that the alarm has been so silenced. Terminals 5 and 6 of connector P6 may also be connected to an external switch or the like for providing a remote input to circuit 60 for silencing alarm HORN1 and illuminating LED D1. Gate U2 is also connected to a serial output driver U10 and terminals 8, 9 an 10 of connector P6 for providing a serial output indication to a remote monitoring or control circuit indicative of an alarm condition at power distribution control unit 24. Other remote communication protocols, such as SNMP on Ethernet, may be employed. Provision may also be made for remote control of the unit, such as remote turn-off of the alarm horn. An alarm condition is also provided through normally open contacts of a relay switch RLY4 coupled to terminals 1 and 2 of connector P5. These relay switch contacts close in the event of an alarm condition to provide a corresponding alarm indication at a remote site.

There is thus provided a power distribution system, and an apparatus for controlling distribution of d.c. power to a plurality of remote d.c.-powered devices, that fully satisfy all of the objects and aims previously set forth. The remote devices are normally connected to the primary power supplies, and are automatically switched to the auxiliary power supply or supplies in the event of failure at any one of the primary supplies. The operating conditions of the several supplies are analyzable through visual observation of the various LED's, and an inoperative supply may be readily replaced without interrupting application of electrical power to the remote devices. In the event that a primary supply fails, the associated devices are automatically connected to the auxiliary supply and, when the primary supply has been replaced, the associated devices are automatically reconnected to the new primary supply without any power interruption. The control circuit output is protected by circuit breakers CB1–CB6, which are accessible through cover 54 (FIG. 2), and may be reset by an operator. Failure alarms are provided both locally and remotely, and both visually and audibly. The audible alarm may be selectively silenced by an operator either locally or remotely, but the visual alarm indication remains set until repairs are effected.

We claim:

1. Apparatus for controlling distribution of d.c. power to a plurality of remote d.c.-powered devices that comprises:
   a plurality of independent d.c. power supply means including means for connecting said plurality of power supply means to a source of electrical power,
   a plurality of electrical switch means operable in a first mode of operation for connecting a first number of said power supply means to apparatus output means for connection to the remote devices,
   means for detecting failure at one or more of said first number of said power supply means, and
   means responsive to said failure-detecting means for operating one or more of said switch means in a second mode of operation to connect a second number of said power supply means different from said first number to said output means in place of the one or more power supply means at which failure is detected.

2. The apparatus set forth in claim 1 wherein said plurality of d.c. power supply means are independently replaceably mounted in said apparatus.

3. The apparatus set forth in claim 2 wherein said plurality of power supply means have input means connected in parallel to input power connection means in said apparatus.

4. The apparatus set forth in claim 3 wherein said first number of said power supply means have outputs connected in parallel to said output means through said switch means and disconnected from each other.

5. The apparatus set forth in claim 1 wherein said apparatus output means comprises a plurality of parallel output means disconnected from each other, one for connection to each remote d.c.-powered device.

6. The apparatus set forth in claim 5 wherein said output means are connected by said switch means to said first number of said power supply means such that each of said first number of power supply means applies d.c. power to a preselected number of said devices through said output means in said first mode of operation of said switch means.

7. The apparatus set forth in claim 6 wherein each of said output means includes means for indicating application of electrical power to said output means and through said output means to a corresponding device connected to said output means.

8. The apparatus set forth in claim 7 wherein each of said output means further includes circuit breaker means connecting each said output means to an associated said switch means.

9. The apparatus set forth in claim 1 wherein said failure-detecting means comprises means for comparing output voltage at each power supply means of said first number of power supply means to output voltage of said second number of power supply means, and means for switching said switch means from said first to said second mode of operation when power output at the associated power supply means of said first number reaches a predetermined level with respect to the output voltage of said second number of power supply means.

10. The apparatus set forth in claim 1 wherein said failure-detecting means further includes means for indicating that a failure has been detected at one or more power supply means of said first number.

11. The apparatus set forth in claim 10 wherein said indicating means includes audible indicating means.

12. The apparatus set forth in claim 11 further comprising means for selectively silencing said audible indicating means.

13. The apparatus set forth in claim 12 wherein said selectively silencing means comprises operator switch means on said apparatus.

14. The apparatus set forth in claim 13 wherein said selectively silencing means comprises means for silencing said audible indicating means responsive to a signal from a remote location.

15. The apparatus set forth in claim 14 further comprising means for indicating that said audible alarm indicating means has been silenced.

16. The apparatus set forth in claim 10 wherein said indicating means includes means for indicating said failure at a remote location.

17. The apparatus set forth in claim 10 wherein said indicating means comprises an output port and means for indicating said failure to a remote monitor through said output port.

18. Apparatus for controlling distribution of d.c. power to a plurality of remote d.c.-powered devices that comprises:
    a plurality of first d.c. power supplies and at least one second d.c. power supply, all including means for connection to a source of electrical power to provide output d.c. power independent of each other,
    a plurality of electrical switch means each operable in a first mode of operation to connect one of said first power supplies to at least one set of output means for connection to a remote device.
    means for comparing output voltage at each of said first power supplies to output voltage at said at least one second power supply to indicate a failure condition at one of said first supplies, and
    means responsive to said failure condition indicating means for operating one or more of said switch means in a second mode of operation in which at least one set of said output means is connected to said second power supply.

19. The apparatus set forth in claim 18 wherein said first and second power supplies are replaceably mounted on a mounting panel.

20. The apparatus set forth in claim 19 wherein said output means are accessible on said panel for connection to the remote devices.

21. The apparatus set forth in claim 20 wherein said switch means, said comparing means and said switch operating means are mounted in a circuitboard assembly on said panel.

22. The apparatus set forth in claim 21 wherein said circuitboard assembly further includes illuminating means for indicating application of electrical power to said output means.

23. The apparatus set forth in claim 22 wherein said circuitboard assembly further includes circuit breaker means connecting each of said switch means to associated output means.

24. The apparatus set forth in claim 23 wherein said circuitboard assembly further includes means for indicating operation in said second mode.

25. The apparatus set forth in claim 24 further comprising a cover on said panel overlying said circuitboard assembly, said output means, said illuminating means, said circuit breaker means and said indicating means being accessible through said cover.

* * * * *